May 19, 1959  N. L. DEAN  2,886,976
SYSTEM FOR CONVERTING ROTARY MOTION INTO UNIDIRECTIONAL MOTION
Filed July 13, 1956  4 Sheets-Sheet 1

Norman L. Dean
INVENTOR.

May 19, 1959  N. L. DEAN  2,886,976
SYSTEM FOR CONVERTING ROTARY MOTION INTO UNIDIRECTIONAL MOTION
Filed July 13, 1956  4 Sheets-Sheet 2
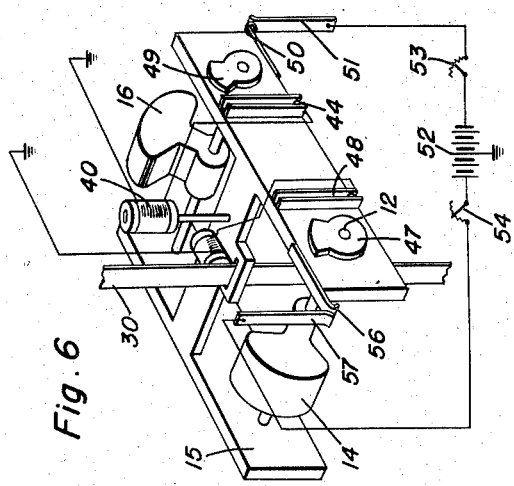
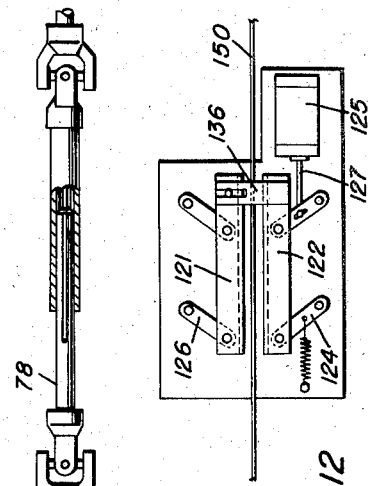
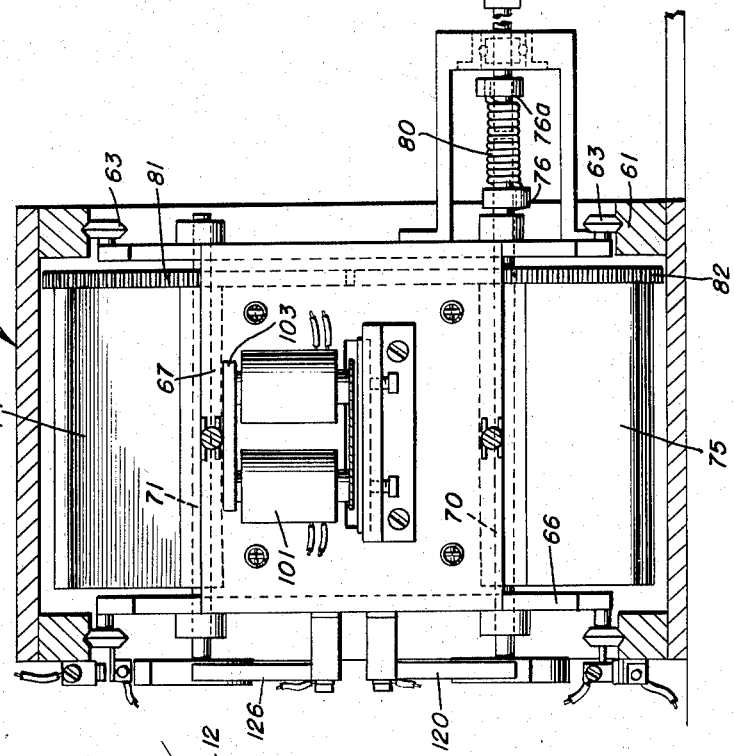
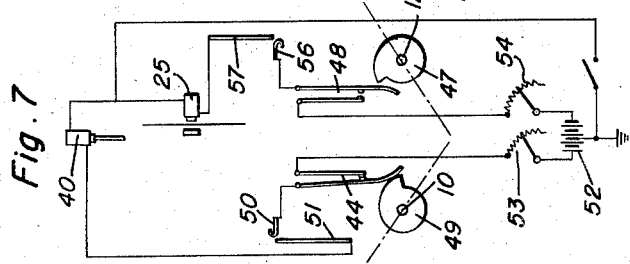
Norman L. Dean
INVENTOR.

May 19, 1959  N. L. DEAN  2,886,976
SYSTEM FOR CONVERTING ROTARY MOTION INTO UNIDIRECTIONAL MOTION
Filed July 13, 1956  4 Sheets-Sheet 3

Norman L. Dean
INVENTOR.

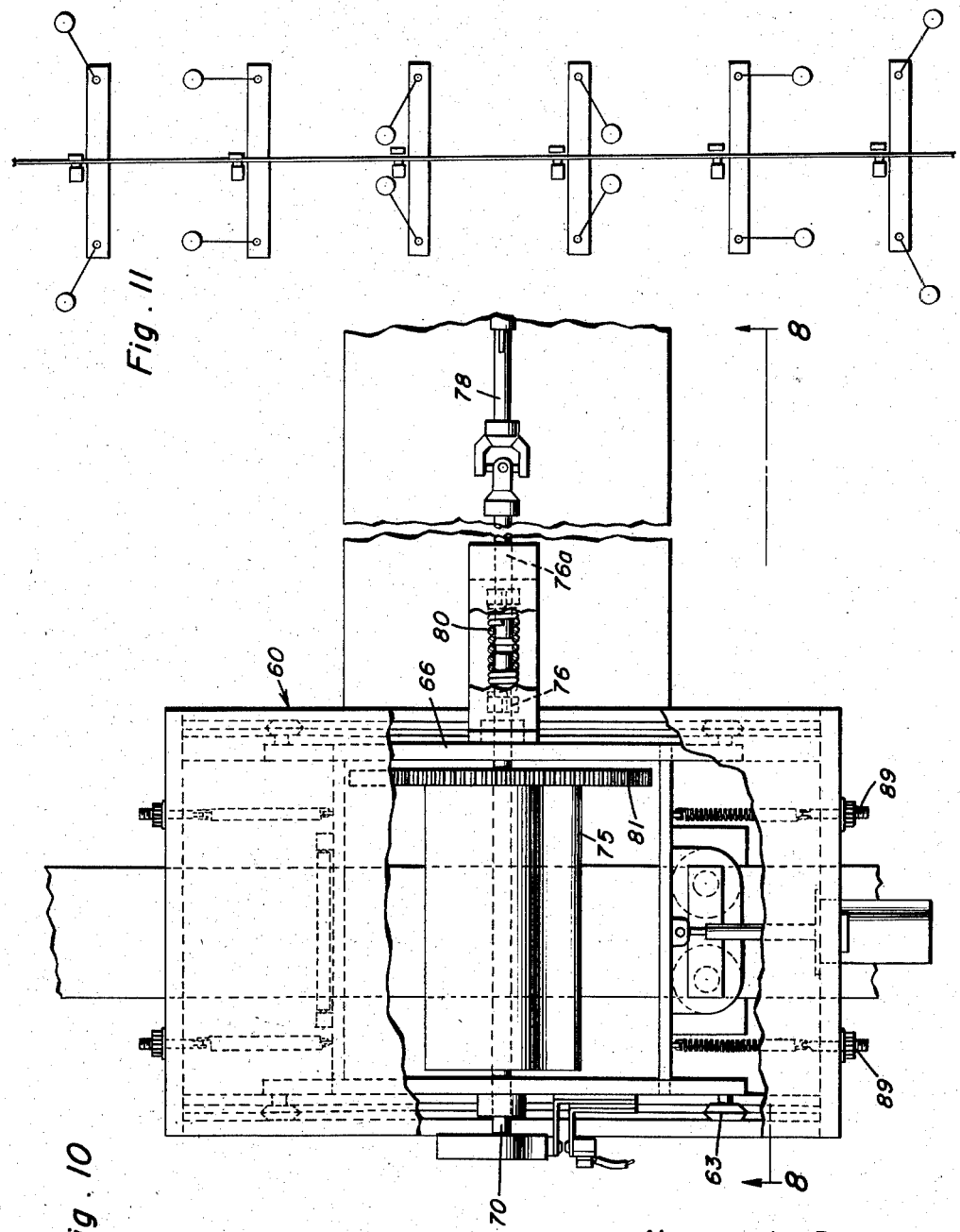

United States Patent Office 2,886,976
Patented May 19, 1959

2,886,976

SYSTEM FOR CONVERTING ROTARY MOTION INTO UNIDIRECTIONAL MOTION

Norman L. Dean, Washington, D.C.

Application July 13, 1956, Serial No. 597,805

19 Claims. (Cl. 74—112)

This invention relates to driving systems for producing unidirectional motion and it has for its primary object to provide a propulsion system in which a rotational movement produced by a prime mover is converted into a continuous or intermittent unidirectional movement of a load carrier which may or may not be the carrier of the rotational elements of the system.

Devices using freely suspended rotating eccentric inertia masses are known which produce an oscillatory movement of the carrier of the rotating inertia masses. This oscillating movement is obtained by limiting the degrees of freedom of the freely suspended eccentric rotating inertia mass or masses to such an extent that movement can only occur in substantial parallelism to one plane. Such a limitation of the degrees of freedom of movement of the freely suspended rotary inertia mass or masses may be produced in several different ways.

One of the methods of limiting the degrees of freedom of such a system consists in providing a pair or pairs of eccentric rotating inertia masses, rotating in opposite directions about parallel linear axes which are rigidly connected. This rigid connection between the shafts rotating the eccentric inertia masses, the axes of which form the axis of rotation of the masses, and the rotation of the said eccentric masses in opposite directions produce a cancellation of the forces and reactions engendered in all directions except in the direction parallel to a plane at right angles to the axes of rotation of the rotating masses. The result of this cancellation is an oscillation of the system at right angles to the axes of rotation produced by the resultant forces which represent the sum of the components of all the forces acting in this direction, engendered by the rotation of the masses. It will be clear that a freely suspended oscillating system of this type is not subjected to any other reaction or force.

Devices of this type have been constructed for imparting oscillatory movement to some member or load device either for testing purposes or for the purpose of producing a regular vibration.

My invention essentially consists in providing a system of the type above described in which an oscillatory movement of a freely suspended inertia mass or of a plurality of such masses is produced by the rotation of a mass or masses around an axis or axes and by limiting the degrees of freedom of movement of said freely suspended mass or masses, and in which the oscillatory movement of the system produces a continuous series of unidirectional impulses which may be transmitted to a suitable load device or which may act on the carrier of the system itself, without however reacting on or otherwise influencing the frequency or amplitude of the said oscillatory movement.

The system is thus distinguished from a system of transmission of energy of motion to an exterior mechanism or system which produces a reaction between the said systems or mechanisms, by damping the oscillations.

While preferably pairs of eccentric inertia masses rotating about parallel axes in opposite directions are used in such a system it will be clear that the oscillatory movement of the system may also be produced by other means, for instance by guides or guide channels limiting the movement of a freely suspended shaft which rotates an eccentric inertia mass at high speed.

The principle of the invention may be best understood by referring to the oscillatory movement produced by a freely suspended eccentric inertia mass guided along a linear guide channel or by pairs of such freely suspended eccentric inertia masses of identical weight rotating about parallel linear axes in opposite directions. Any point of the system located in the plane of symmetry passing through the guide channel or located in a plane of symmetry passing between the axes of rotation of the freely suspended eccentric weights will oscillate within this plane in a direction which is parallel to the guide channel or which is at right angles to the plane passing through the parallel axes of rotation. This oscillation occurs around a central position. If a load is imposed during the oscillation of the system in the central position in such a manner that only movement in one direction will act on and move the load, for instance if the oscillation takes place in a vertical plane and if a weight is so placed that the oscillating system comes into contact with the said weight in the central position, it will be clear that the weight will be lifted during the upwardly directed stroke and that this lifting of the weight will shorten the normal elongation of the system.

However, on account of the free suspension of the rotating masses and their shafts the amplitude of the oscillation during the back swing of the system is not affected or changed thereby as the centrifugal and other forces which cause the oscillation of the system remain unchanged. All points of the system thus will swing back first to a new central position and from there to a position corresponding to a full normal amplitude of the oscillation and the elongation with respect to the new central position of the back swing will be the same as it would have been if the weight had not been applied. The system thus reaches a new position at the end of the back swing in which its distance from the position of the weight (originally applied in the central position) is again equal to the full amplitude.

The following vertical upswing therefore would only move the system to such an extent that it would just come into contact with the weight applied in its extreme position, but this upwardly directed swing would not move the weight which has been applied anymore.

To produce a lifting of the weight it is therefore necessary to displace or shift the system by suitable means so as to bring it back into its original position. This movement must be performed by means of external forces acting on the system, but these external forces need not overcome a high resistance if the proper moment is chosen for this movement. When the shifting of the system is performed at the time when the resultant of the forces producing the oscillation is either zero or points in the direction in which the system is moved, only the inertia of the carrier and shafts has to be overcome which, if these members are sufficiently light in weight, is practically insignificant.

By moving the system in this way by external forces towards a load, the load may be lifted intermittently but continually. Instead of moving a load directly, a coupling may be applied to an element coupling the system at the proper moment to an exterior member while uncoupling the system during its back swing and during the shifting. In this way a series of unidirectional impulses may be transmitted to the said member.

It will also be clear that the system may be moved along a fixed member.

The principle of the invention thus consists in converting the energy of an oscillatory movement of a system, consisting either of a freely suspended, rotary eccentric, inertia mass guided along a linear guide, or of pairs of freely suspended rotary eccentric inertia masses rotating in opposite directions around parallel axes of rotation, into unidirectional impulses applied to a load, preferably by a cyclical coupling of the system with a load accompanied by cyclic shifting of the system. This principle is preferably applied by producing a coupling of the system with the load device during that phase of the oscillation during which the latter and the forces producing it have a direction which coincides with the desired direction of movement or of application of the impulses, and by producing the shifting of the system at the time at which the said forces are approximately zero so that a minimum resistance will be offered to such shifting.

The main object of the invention therefore consists in providing a driving system including a freely suspended rotary inertia mass which by suitably limiting the degrees of freedom of its movement produces an oscillatory movement of the system of a definite frequency and amplitude, which driving system periodically transmits unidirectional impulses to a load device without producing a reaction on the frequency and amplitude of the oscillation of the system.

A further main object of the invention consists in providing an oscillating system, the oscillation of which is maintained at a definite frequency and amplitude by means of pairs of freely suspended inertia masses, rotating at the same speed but in opposite directions about parallel axes with respect to which they are eccentrically mounted, said system supplying energy to a load system cyclically and unidirectionally during one phase of each oscillation, while said system is cyclically shifted by external forces after each impulse during a predetermined phase of the oscillation during which the resistance of the system against displacement is at a minimum.

The further objects of the invention will be more clearly understood when referring to the following specification.

The invention is illustrated diagrammatically in the accompanying drawings by way of example. The diagrams illustrate only the principle of the invention and one mode of applying said principle. It is however to be understood that the purely diagrammatic showing does not offer a survey of possible constructions and a departure from the constructional features diagrammatically illustrated does not necessarily imply a departure from the principle of the invention.

In the drawings:

Figure 6 is a diagram illustrating the control of the system diagrammatically illustrated in Figure 5.

Figure 7 is a diagram of the connections of the control system illustrated in Figure 6.

Figures 8 and 9 are diagrammatic elevational side views at right angles to each other of an embodiment of the invention in which a tape to which a load is attached is moved horizontally.

Figure 10 is a diagrammatic plan view of the same embodiment.

Figure 11 is a diagram showing the cooperation of a plurality of units.

Figure 12 is a diagram of an electromagnetically operated mechanical clutch.

Figure 1:
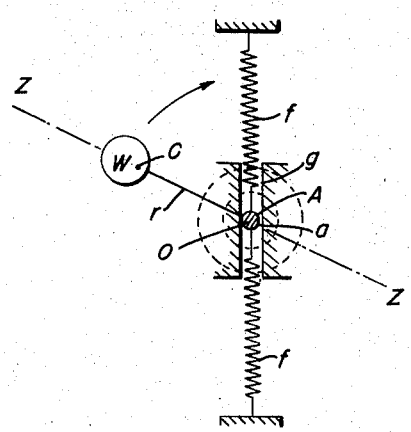
Figures 1, 2 and 3 are diagrams illustrating the restriction of the movement and the various positions of a freely suspended rotating mass during one revolution, Figure 2 illustrating the positions without application of a load and Figure 3 illustrating the positions adopted during one revolution when a load assumed to stay in a fixed position is applied.

The principle on which the invention is based will be best understood by referring to Figures 1 to 4. A rotating mass or weight W with center of gravity C which is eccentric with respect to the axis of rotation A and which is rotated by a shaft $a$ is freely suspended, for instance, between suspension springs $f$. A rotation of the weight W around the shaft $a$ will produce a gyratory movement of the system, the axis of rotation A describing a circle. If this movement as shown in Figure 1 is restrained so that the shaft $a$ may only move between the two fixed guides $g$ the movement of the freely suspended shaft $a$ becomes an oscillatory movement within the guide channel $g$ in a plane which is parallel to the said guides. This oscillation takes place around the center 0 through which the axis of rotation A passes during the oscillation.

Figure 4:
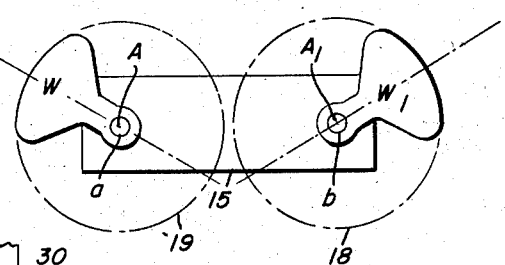
Figure 4 is a diagram illustrating the restriction of movement produced in a system using pairs of masses rotating around parallel shafts in opposite direction.

As explained below in connection with Figure 4, the guides $g$ may be replaced by an arrangement comprising two shafts $a$, $b$ carrying two identical eccentrically mounted weights W, $W_1$ and rotating in opposite directions around their respective axes of rotation A and $A_1$. If these shafts $a$, $b$ are held for rotation within members rigidly connecting them, these members will take up the forces and reactions engendered between them and as, on account of the opposite direction of rotation of the eccentric weights, these forces and reactions are opposed to each other and neutralize each other, this will produce exactly the same effect as that produced by the guides $g$ and only forces or reactions at right angles to the plane passing through the axis of rotation can manifest themselves.

Oscillating arrangements of this type are known and have been used for producing an oscillatory movement in one plane. The special problem dealt with by my invention, however, consists in transforming this arrangement into a source of unidirectional power, producing unidirectional impulses which may be transmitted to any lifting or propelling device and which thus may be used for the lifting or propelling of a load or the lifting or propelling of the unit on which the system is mounted.

Figure 2:
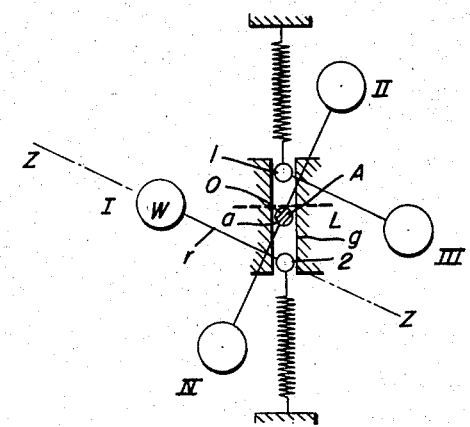
Figure 3:
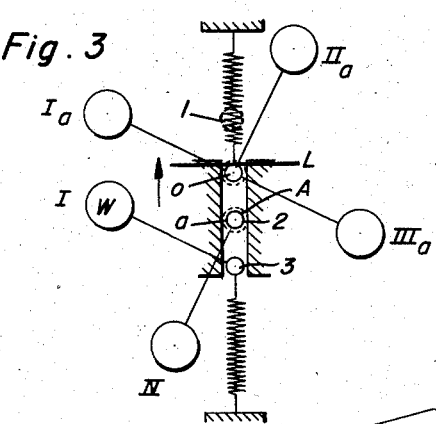

Referring now to the diagrams Figures 2 and 3 in which a pair of rotating weights is again replaced by a single rotating mass W guided between fixed straight guides $g$ and in which the free suspension of the shaft $a$ is again indicated by means of springs $f$, it will be seen that, upon rotation of the eccentric mass W the shafts $a$, if freely suspended, will oscillate between the positions 1 and 2. During these oscillations the weight W and the arms $r$ will occupy the positions indicated at I, II, III and IV. If now a load L is imposed on the shaft $a$ whenever it reaches the central position 0 of the oscillation the load will be moved during that phase of the oscillation during which the sum of the resultants of the driving couples and centrifugal forces and of their reactions have components in the desired direction which is hereinafter termed the positive direction. It will be clear that this occurs during the positive portion of the cycle.

In the diagram Figure 3 it is now assumed that the load L is not moved but that merely pressure is exercised by the shaft $a$ on the load during the positive portion of the cycle. A continuous series of impulses can, however, not be maintained with this arrangement when left to itself. While, as long as the weight W remains on the positive portion of the cycle (between positions I$a$ and III$a$) in which the resultant of the forces is directed toward said load L, an impulse can be produced which is upwardly directed in the diagram, the negative phase of the cycle (positions III$a$, IV, I) which now starts from point 0 will produce a back swing covering the full amplitude so that the shaft $a$ at the point of maximum elongation will be in position 3. The center 0 of the oscillation is thus shifted to the position 2 and the next positive cycle, starting at position 3 would bring the shaft *a* just back to the load L but would not produce any further impulse on the load L.

Therefore, as indicated in the diagram Figure 3, a system for producing continually impulses in one direction on the load L must include means for shifting the system, and especially the shaft *a*, towards the load. This additional shifting is preferably performed when the rotating weight W has reached position I which is a zero position in which the resultant of all forces and reactions is approximately zero. Shifting may also occur in a position in the vicinity of position I in which the resultant of the forces and the reactions start to point in the positive direction which is also the direction of the shift.

The resistance of the system against shifting will then be small and will not include the inertia of W but solely the mass of the shaft and frame which parts should be made as light as possible, a requirement which is also to be considered as being of advantage from many other viewpoints. The shaft and frame being as light as possible relatively to the weight W will also reduce the reaction of the system formed by the weight W the arm *r*, and the shaft *a*, developing in the center of rotation A.

The shifting of the shaft *a* will bring the system back into the original position relatively to the load L and therefore the second cycle now starting after the shift will again produce an impulse on the load L in the selected direction.

Figure 5:
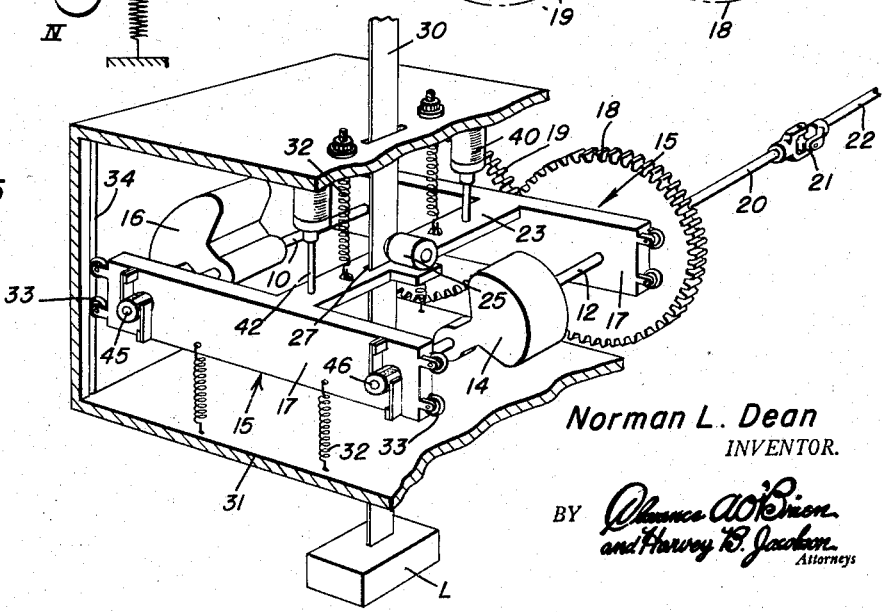
Figure 5 is a diagram illustrating in particular the general arrangement of the system.

The shifting movement may be produced by means of a solenoid or by a set of solenoids indicated at 40 in Figure 5 which solenoids will be energized at a predetermined point (position I in Figure 3) which movement produced by the solenoid brings the system into the position I*a* with shaft *a* in the point 0.

It has been assumed, for the purpose of explanation, that a series of impulses has to be applied to a stationary load. However, in the majority of practical applications a continuous though intermittent advance of the load in a given direction has to be produced by the impulses delivered by the system. Therefore, the system, after shifting, is coupled with the load and has to be released or uncoupled when the impulses have been delivered for a free back swing. A gravitational load held against back movement may be advanced without such a coupling if the system acts in a vertical direction as indicated in Figures 1 to 3. However, in most cases a coupling of the system, delivering the impulses to the load device, will be necessary which coupling may be produced either by a mechanical coupling or clutch, for instance a clutch with eccentric jaws and gripping automatically a member such as a tape, cord or cable attached to the load whenever the system is moved in one direction, while releasing this grip when the system is moved in the opposite direction, or by means of a magnetic clutch operating by means of electromagnets. The electromagnets may operate the jaws of a clutch or may directly cooperate with the steel tape.

The electromagnets of the clutch are energized during that portion of the cycle during which the load is imposed on the system and the impulses are delivered to it. When this phase has passed the electromagnets are de-energized thus uncoupling the impulse delivering system from the load device. Obviously the load supporting means or steel tape must be held by a mechanical or magnetic locking device during the period during which the impulse delivering system is uncoupled.

It will be noted that the shifting of the impulse delivering system and the coupling of said system with the load device directly succeed each other, they both occur in succession at the start of the positive phase of the cycle.

Figure 9:
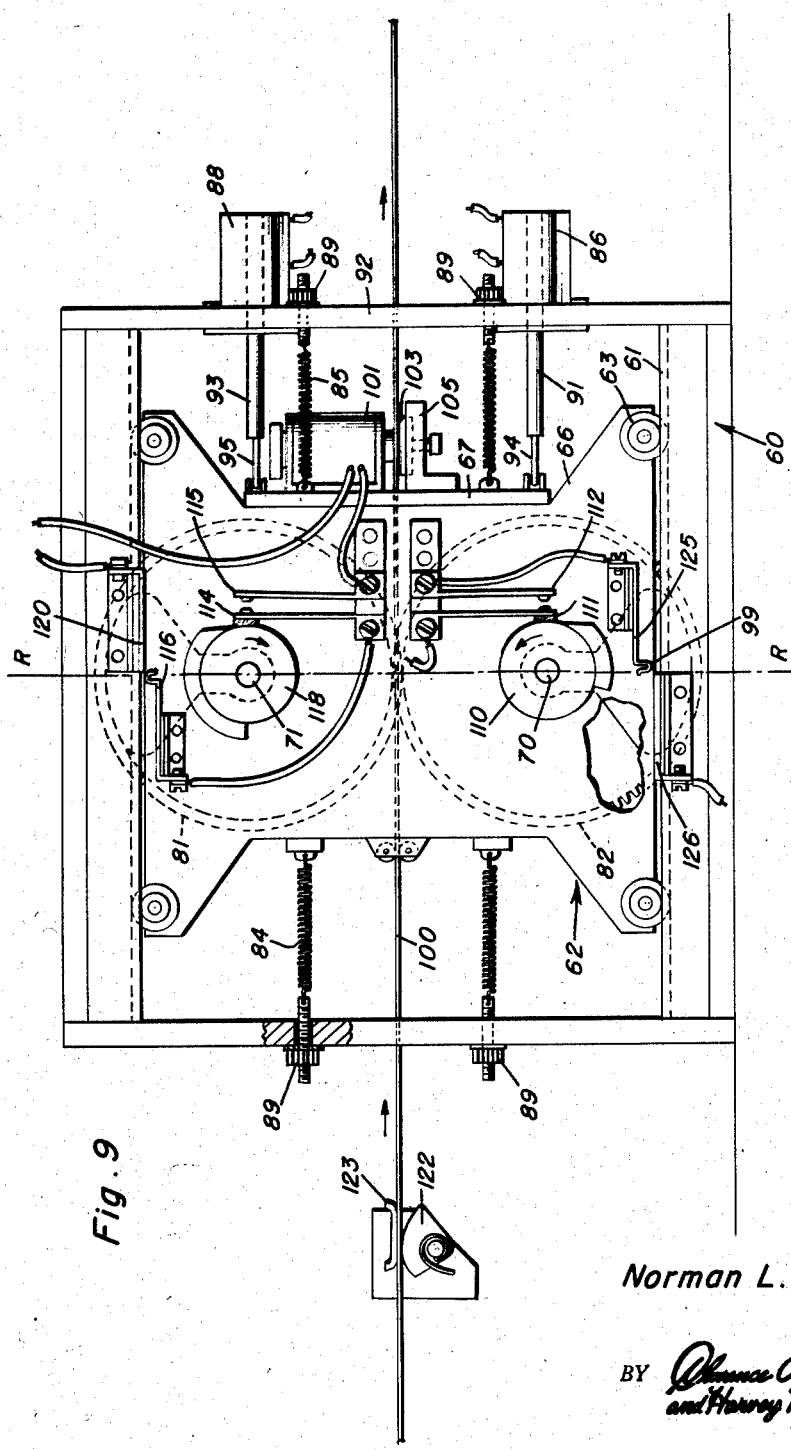

Further, it may be noted that while the impulse delivering system does not have a fixed position in space with respect to a reference system, the movement shifting the system may be utilized to bring it always back to the fixed position with respect to a predetermined reference system R—R as indicated diagrammatically in Figure 9.

Referring now to the diagram shown in Figure 5 in order to explain the basic construction and operation of the device according to the invention it will be seen that two rotatable shafts 10, 12 are journaled within a freely suspended movable framework 15. On each shaft a weight 14, 16 is secured eccentrically and is rotated by the shaft at high speed. Each shaft may carry a gear wheel 18, 19. The two gear wheels may mesh and one of the shafts 12 may be provided with an extension 20 which by means of a universal joint 21 connecting it with an intermediate shaft 22 may be driven by means of a drive motor. The two eccentric weights 14 and 16 rotate at the same speed in opposite directions. The intermediate shaft 22 may be joined to the shaft of the drive motor by means of a second universal joint shown in Figure 8 to provide free movement and adjustability and the said intermediate shaft in addition may consist of two splined portions which two shaft portions may therefore move relatively to each other in a longitudinal direction.

The frame 15 consists of two side plates 17 which may be joined by a transverse bridge member 23 carrying the magnetic clutch 25 which, in the example illustrated, acts on a steel tape 30 passing centrally through the said bridge piece, slots 27 being provided in the said transverse member of the frame for such passage.

The framework 15 may be movably suspended within a fixed outer frame 31 by means of a series of finely adjustable suspension springs 32. The inner movable framework 15 may be provided with rollers, wheels or balls 33 running on tracks 34 fixed in the outer frame 31 to permit an oscillatory movement of the inner frame with the smallest possible friction.

To produce the shifting movement of the frame 15 which has been explained above two solenoids 40 are arranged which are mounted on the outer frame 31, the retractable cores of which may be provided with extensions forming lifting rods 42 attached to the transverse or bridge piece 23 of the movable framework 15. When the solenoids are energized, the frame 15 after having made its back swing is thus lifted and is brought into the desired position relatively to the outer frame and the load.

As above explained the energization of the solenoids 40 as well as the energization of the clutch electromagnets 25 must be exactly timed in order to produce a smooth function of the device. The clutch electromagnet 25 must be energized during that phase of the cycle during which the resultant of the centrifugal forces and reactions produce suitably directed or positive resultants, for instance an upwardly directed resultant in Figure 5, while the solenoids 40 must be operated during the start of the positive phase of movement following the greatest negative elongation.

To produce this precisely timed operation suitable control means are provided for controlling the energization of the electromagnetic devices. These means are illustrated especially in the diagrams in Figures 6 and 7.

In the example shown in Figure 5 each of these means consists of a rotating commutator or contact device cooperating with suitable brushes or contact springs and in sliding contact devices such as illustrated in Figure 6 by way of example.

Rotating commutators 45, 46 associated with the shafts 10 and 12 are provided in order to produce an operation which is in exact conformity with the position of the weights 14, 16 and with the forces generated thereby.

The slide contacts, on the other hand, are provided in order to produce energization of the said magnets only in predetermined spatial positions of the movable framework 15 relatively to a point or plane of reference which may be fixed on the frame and also to produce the successive timing of the energization.

As seen in Figure 3 the solenoid must be energized in a position of the shaft *a* in which the back swing of the oscillation has been performed and in which the system starts again to move in the direction towards the load. This phase of the movement is reached when the weights W on the shaft *a* reach the position marked I in Figure 3.

The clutch magnets 25, however, are operated when, after shifting of the position of the framework by means of the solenoid 40 the weights start to move in the positive cycle. The clutch magnets therefore remain energized as long as the weights move through this portion of the cycle.

In Figure 6, illustrating the control and contact device diagrammatically, the commutators which usually consist of a drum with conducting and non-conducting surfaces cooperating with a brush, are shown for the sake of better illustration in the shape of cams pressing contact springs, which springs control the circuits of the solenoids and of the clutch electromagnets. The commutators, as will be clear, make and break the circuit in exact conformity with the position of the weights 15, 16, the contact springs 44 being closed by cam 49 the moment in which the weights 14, 16 reach approximately the zero position (position indicated by dots and dashes at z—z in Figures 1 and 2) and the commutator segments or cam surfaces are arranged correspondingly.

A commutator 48, 47 controlling the solenoids is likewise operated in a definite position of the weights 14, 16 close to position I in Figure 2 and the cams 47 and contact springs 48 are arranged accordingly.

The commutator devices are preferably finely adjustable as they determine the starting point of the cycle and also the duration of the impulses. Energization and de-energization of the solenoids, in addition to being timed relatively to the cyclical position of the weights must also occur in a certain well defined position of the frame 15 relatively to a reference system. This is of special importance as a part of a movement of the framework 15 is an oscillation which is only opposed by springs. As small differences of elongation and a high number of revolutions may lead to quite substantial deviations if not corrected, a reference contact device, formed by a slide contact, controlling the position of the frame, is arranged correcting the deviations and bringing the framework always precisely into a fixed spatial position relatively to the fixed frame and its reference system in which the load starts to be coupled with the system.

For this purpose the framework is provided with a slide contact 50 cooperating with a fixed contact 51 arranged on or near the fixed frame. The energizing circuit of the solenoids includes these contacts so that energizing and de-energizing will only occur if the correct position of the framework 15 within the frame 30 has been reached.

A slide contact device is preferably also inserted into the energizing circuit of the clutch electromagnets in order to secure correct succession of the energization of this magnet and of the solenoids in a definite position of the framework. This slide contact device is indicated at 56 and 57 in Figure 6.

Figure 7 shows the circuit connection of the device illlustrated in Figure 6. As seen in this figure the circuit of the solenoids includes the source of current indicated at 52 and an adjustable resistance 53, as well as the contact springs 44 controlled by cam 49 on shaft 10, the slide contact 50 carried by the frame 15 and the fixed slide contact 51.

The circuit of the coupling magnet 25 includes the same source of current 52, the adjustable resistance 54, the contact springs 48 controlled by the cam 47 on shaft 12, the slide contact 56 on the frame and the fixed slide contact 57.

It will be noted that the position of the weights by means of the cams control the two circuits. In addition the slide contacts 56, 57 and 50, 51 permit energization of the solenoid 40 and coupling magnets only in sequence, as slide contact 56 on the oscillating frame reaches fixed slide contact 57 only when the slide contact 50 leaves slide contact 51. Moreover energization of the solenoid does not occur if during the oscillation of the frame, the contact 50 should overrun contact 51, but occurs only when both weight position and position of the frame relatively to the fixed frame permits shifting to the desired point.

Likewise, the energization of the coupling magnet 25 can only occur after the shifting, this sequence being enforced by the position of the contact device indicated at 50, 51 relatively to the contact device indicated at 56 and 57 in Figure 6.

A device constructed in accordance with the invention is shown in a very simplified form in Figures 8 to 10. This device advances a steel tape 100 continuously in one direction. The load (not shown) is attached to said steel tape.

The device as illustrated in Figures 8, to 10 comprises an exterior fixed frame 60 provided with tracks 61 extending longitudinally along the frame. A carriage 62 reciprocates on the tracks. The movable carriage which is the equivalent of the frame 15 in Figures 1 to 6 may consist of side plates 66 joined by transverse plates 67 and it may be provided with balls or rollers 63 running on the track 61. The arrangement shown in Figures 8–10 produces a movement of the carriage in a horizontal direction, but it will be clear that the position of the frame and carriage in space is, in fact, immaterial.

The carriage 62 is provided with shafts 70 and 71, each shaft carrying a weight 74, 75, respectively, which is eccentrically mounted thereon, the center of gravity of the weights being at a distance from the axis of the shaft.

It may be noted in this connection that the weights 74, 75 should embody as high a percentage of the total weight of the carriage as is constructively possible and conversely the carriage and the shafts should be as light as possible. This may be obtained by making the carriage of a light material such as light metal or a plastic or a light alloy, while making the weights of steel or of heavy metal alloys.

The shafts may be driven by any motor, for instance, by an electric motor which may be mounted on the carriage itself. However, in order to reduce the weight of the carriage the construction illustrated shows a motor which is mounted on the fixed frame and which transmits power to the shafts 70 and 71 by means of an intermediate shaft 78 joined to an extension 76 of one of the shafts 70 by means of a universal joint.

If the carriage moves in a transverse direction it is preferable to insert an intermediate shaft 78 between the motor and the shaft extension which either consists of two telescopic members or which consists of two parts one of which is splined on the other so as to permit longitudinal motion to a limited extent. The motor shaft is thus enabled to drive the shaft extension 76 notwithstanding its transverse linear motion.

A torsion coupling 80 is preferably inserted between the intermediate shaft and the shaft extension or if the extension is split as illustrated in Figure 8 the torsion coupling is inserted between the two parts 76, 76a of the extension. This torsion coupling is indicated in the figures as a torsion spring 80 connecting the two separate parts of the shaft extension 76 and 76a. The torsion coupling permits a relative angular movement between the drive portion of the shaft 76a and the driven portion 76. Such angular motion occurs on account of speed variations in the rotational speed of the weights which are driven by a motor of constant speed; such variations further occur during the shifting of the carriage at the end of an outwardly directed oscillation which has been described above. The shifting movement essentially moves the shafts without moving the weights thus producing a retrograde movement of the shafts. Further the shifting movement is not instantaneous and especially in the event of a high rotational speed of the weights the latter will perform an angular movement around the shaft of a sizable magnitude during the shifting operation. This angular movement is dependent on the speed of rotation and on the impedance of the solenoid which usually cannot be decreased below a certain value. A shifting of the carriage by the solenoids thus amounts to a retardation of the rotational speed which is equivalent to a rotation of the shaft 70 or 71 in a direction opposite to the direction of rotation which movement must be taken up by the torsional coupling 80.

The weights 74, 75 must be strictly equal and must rotate at the same speed in an opposite direction. It is preferable to drive the shaft 71 by means of a gear wheel transmission from the shaft 70. These gear wheels are illustrated at 81 and 82, the two gear wheels 81, 82 meshing with each other.

The carriage 62 is freely suspended between springs 84, 85 which are attached to the frame and which are so dimensioned that they tend to bring the carriage 62 back into a central position whenever it has been moved to one side. The spring tension must be finely adjustable, as they must assist in stabilizing the operation and in maintaining the frame oscillation in the desired spot and in securing the correct sequence of operational phases. They are provided with special but well known tension adjustment devices indicated at 89 in the figures. In fact, the carriage is always brought back to the fixed reference position R—R (Figure 9) not only by means of the solenoids 86 and 88 but also under active assistance of the springs.

The solenoids 86 and 88 are shown in the example illustrated as being mounted on a side plate 92 of the fixed frame but it will be understood that this is not essential. Each of the solenoids is provided with a movable core 91, 93 attached to a rod 94, 95 which is joined to a transverse plate 67 to which also the springs 85 may be attached.

In the modification illustrated in Figures 8 to 10 an electromagnetic clutch device is used. The electromagnetic clutching device consists of the clutch electromagnets 101 which are mounted on an extension 105 of the side plate 67 which magnets, in the example illustrated, grip the tape 100 carrying the load. The clutch electromagnets 101 preferably cooperate with an armature 103 which may face the two electromagnets and may close the magnetic field circuit upon energization of the said electromagnets, the tape being firmly gripped between said armature and the magnet poles and being thus moved with the carriage during such energization. Upon de-energization of the clutch electromagnets the tape is released and the carriage may start on its return movement without in any way affecting the tape.

In Figure 12 an electromagnetically operated mechanical clutch is illustrated. The tape or belt 150 is gripped by jaws 121, 122, each of which is linked to parallel pivoted levers 124, 126. The two jaws 121, 122 may be coupled by a transverse link 136. The jaws which are only dsplaced for a very small distance in order to lose their grip on the tape are operated by a solenoid 125 the core of which carries a rod 127 which is linked to one of the levers 124.

The mechanical coupling is preferably used to move heavier loads.

To obtain an accurate timing of the operation of the clutch electromagnets dependent on the completion of the movement of the carriage under the influence of the solenoids bringing the carriage into its correct position relatively to a reference system the energization of the clutch electromagnets is made dependent not only on the position of the weights but also on the completion of the shifting movement produced by the solenoids. This is obtained by controlling the energizing circuit of the electromagnets by a commutator device and by the slide contacts.

The commutator device in this case is replaced by a cam 118 acting on the contact springs 114 and 115. The cam is mounted on one of the two shafts 71 and the cam surface is so adjusted that the closing of the clutch electromagnet circuits starts approximately in the zero position of the weghts. To prevent, however, an operation of the clutch electromagnets before the solenoid has shifted the carriage 62 into the correct position corresponding to the position of reference R—R, the circuit contains also the contact spring 116 which comes into contact with the spring 120 only after the solenoid circuits have been closed for such a time that the solenoids have been capable of moving the carriage into the position in which the axis of the shaft 70, 71 have reached the correct reference position R—R.

This position R—R is the reference position to which the carriage has been moved by the solenoids and in this position only the slide spring 116 reaches the spring 120, thus closing the circuit of the clutch electromagnets. These clutch electromagnets thus move the tape only during that phase of the cycle during which the carriage is supposed to move the load. These electromagnets are de-energized when the cam 118 does no longer press on the contact spring 114, 115 such de-energization occurring when the carriage starts its back swing. During this back swing the tape to which the load is attached and which may be of any type or kind, must be prevented from sliding back when the grip of the clutch electromagnet is released. Any device gripping or holding the tape when attempting to move in an undesired direction and only permitting movement in the desired direction, such as a sprocket wheel with a ratchet device attached to it may be used in connection with the tape. In Figure 8 a simple clamping device 122 cooperating with a fixed jaw 123 has been shown the movable jaw of the clamping device being mounted eccentrically and being under spring tension.

The control of the solenoid circuit in conformity with the position of the weights and with the position of the carriage relatively to the reference position R—R is exercised by means of the cam 110 operating the contact springs 111 and 112 and by means of the slide contacts 125 sliding on the fixed contact 126. The cams, contact springs and slide contacts are similar to those already described in connection with the clutch electromagnets.

The operation of the device will be clear from the following description.

The weights 74, 75 rotate rapidly with as high a speed as possible. The forces and reactions due to this movement of the weights in the direction of the line joining the axis of the shafts 71 and 70 are completely neutralized and only those forces which are at right angles thereto act on the system. Therefore, an oscillation of the carriage 62 in this direction will start, with the carriage moving back and forth on the tracks around a middle position R—R.

If it is assumed that during such oscillation the carriage 62 has reached its extreme position at the left in Figure 9 and weights 74 and 75 now reached approximately the zero position Z—Z (Figure 2) the cam 110 will close the contact springs 111 and 112, and, as their return journey in the direction of the arrows starts, the springs 125 and 126 also come into contact. Both control contacts of the energizing circuit of the solenoids being closed said solenoids are energized and pull the carriage forward in the direction of the arrow until the line joining the shafts 70 and 71 has reached the desired reference position R—R. In this position the device is now ready for applying a load. Cam 118 has already closed springs 114 and 115, as soon as the zero position of the weights 74, 75 was reached. In the position into which the carriage has now been brought the springs 116 also engage the spring 120 thus closing the circuit of the clutch electromagnets. The clutch electromagnets grip the tape and during the further carriage advance the tape is moved with the carriage.

When the resultant of the forces engendered by the rotational movement of the weights decreases to such an extent that the load can no longer be moved, the clutch electromagnets are de-energized by the cam moved by the weights. As soon as the carriage has reached its end position toward the right in Figure 9 it starts to move back, but the load cannot move back because the tape 100 is gripped by the clamping device 122, 123 and the carriage is therefore free to start its back swing. When the back swing of the carriage has been performed the weights have again moved into the zero position and the above described cycle will repeat itself and the tape will thus be advanced intermittently.

Obviously, the system may also be advanced along a fixed tape if so desired.

If a substantially continuous advance of the load in one direction is desired a plurality of devices such as described may cooperate. Figure 11 shows such an arrangement in which six devices of the same type cooperate with a single tape. By adjusting the phase differences between the devices and by distributing the gripping phases evenly by means of the commutators it is possible to move the tape in the desired direction continuously. These various phases may also overlap so that a practically continuous pull of the tape results. The devices may thus produce a practically continuous lift.

It will be clear that the system according to the invention may be used in many different ways and presents inherent advantages due to the fact that it is independent of reactions produced by external systems. The system, therefore, will be especially of advantage where such reactions have to be avoided.

Further, it will be clear that the embodiment of the invention which has been described may be changed in many ways, some of them have been indicated and such changes do not affect the essence of the invention as described in the annexed claims.

What is claimed as new is as follows:

1. A dynamic system producing unidirectional movement, comprising a freely suspended unit including a rotating shaft, an inertia mass carried by and rotating with said shaft, the center of gravity of said inertia mass being eccentric with respect to the axis of rotation of the shaft, and means limiting the movement of the unit to a movement in a single plane, the rotation of said inertia mass around the shaft thus producing an oscillation of said freely suspended unit in a plane, a load device to which the unidirectional movement is imparted, means for coupling said load device with the freely suspended unit during a phase of its movement during which it moves in one predetermined direction, and means for shifting the freely suspended unit in the aforesaid direction at a time preceding the coupling of the load device with the freely suspended unit and following the swing of the freely suspended unit during oscillation in a direction reverse to the aforementioned predetermined direction.

2. A dynamic system as claimed in claim 1, wherein the means for shifting the freely suspended unit impart to the said unit a shifting movement covering a distance equal to the total amplitude of the oscillation of the freely suspended unit.

3. A dynamic system producing a unidirectional movement comprising a unit adapted to move in all directions, freely suspended on a frame having a reference system thereon relatively to which the freely suspended unit moves, said freely suspended unit including a rotating shaft, an inertia mass carried by and rotating with said shaft, the center of gravity of said mass being eccentric with respect to the axis of rotation of said shaft, means limiting the movement of the rotating shaft to a movement in a single plane, the rotation of said inertia mass thus producing an oscillation of said shaft and thereby of the freely suspended unit in a plane, a load device to which unidirectional movement is imparted, means for coupling said load device with the freely suspended unit during a phase of its movement during which it swings in one predetermined direction, means for shifting the freely suspended unit in this direction at a time when the unit has completed its swing in the direction opposite to that which was maintained during the coupling with the load device, and means for arresting the shifting movement in a predetermined position relatively to the frame and the reference system thereon.

4. A dynamic system producing unidirectional movement, comprising a unit adapted to move in all directions, freely suspended on a frame, relatively to which the freely suspended unit moves, said unit including a rotating shaft, an inertia mass carried by and rotating with said shaft, means limiting the movement of the rotating shaft to a movement parallel to a single plane, the rotation of said inertia mass thus producing an oscillation of the rotating shaft and of the unit in the said plane, a load device to which a unidirectional movement is imparted, means for coupling said load device with the freely suspended unit during the phase of its movement during which it swings in one predetermined direction, means for operating said coupling means, means for shifting the freely suspended unit in the aforesaid direction at the end of the swinging movement of the unit, performed in a direction reverse to the aforementioned predetermined direction, means for operating the shifting means, and a timing means operating successively the operating means of the shifting means and the operating means of the coupling means to secure the immediate succession of the operation of the shifting means and of the coupling means.

5. A dynamic system producing unidirectional movement as claimed in claim 4 wherein means controlled by the rotating shaft are provided for operating the timing means, the latter being thus operated when the inertia mass during rotation has reached a definite angular position.

6. A dynamic system producing unidirectional movement comprising a freely suspended unit including a frame, two spaced parallel shafts rotating in opposite directions held in said frame, an inertia mass supported by and rotating with each shaft, having a center of gravity spaced from the axis of rotation of the respective shafts, the inertia masses on the two parallel shafts being of the same weight and arranged symmetrically with respect to each other, the rotation of the two inertia masses around the rotating shafts thus producing an oscillating movement of the frame, a load device to which the unidirectional movement is imparted, means for coupling said load device with the freely suspended unit during a phase of its movement during which it moves in one predetermined direction, and means for shifting the freely suspended unit in the aforesaid direction at a time preceding the coupling of the load device with the freely suspended unit and following the swing of the freely suspended unit during oscillation in a direction reverse to the aforementioned predetermined direction.

7. A dynamic system producing unidirectional movement comprising an outer frame provided with a reference system thereon, a freely suspended unit including a second frame, two spaced parallel shafts rotating in opposite directions held in said frame, an inertia mass supported by and rotating with each shaft, having a center of gravity spaced from the axis of rotation of the respective shafts, the inertia masses on the two parallel shafts being of the same weight and arranged symmetrically with respect to each other, the rotation of the two inertia masses around the rotating shafts thus producing an oscillating movement of the second frame, a load device to which unidirectional movement is imparted, means for coupling said load device with the freely suspended unit during a phase of its movement during which it swings in one predetermined direction, means for shifting the freely suspended unit in this direction at a time when the unit has completed its swing in the direction opposite to that which was maintained during the coupling with the load device, and means for arresting the shifting movement in a predetermined position relatively to the frame with the reference system thereon.

8. A system as claimed in claim 6, wherein the coupling means are electromagnetically operated, and include an electromagnet, an energizing circuit for said electromagnets, and a circuit making and breaking device for said energizing circuit operated by one of the shafts.

9. A system as claimed in claim 6, wherein the unit shifting means are electromagnetically operated, and include a shifting solenoid, an energizing circuit for said shifting solenoid, and a circuit making and breaking device in said energizing circuit, operated by one of said shafts.

10. A system as claimed in claim 6, wherein the coupling means are electromagnetically operated and include an operating electromagnet, an energizing circuit for said electromagnets, a circuit making and breaking device for said energizing circuit operated by one of the shafts, said operating being adjusted to make and break the circuit in a predetermined sequence dependent on the position of the rotating inertia masses relatively to a fixed reference system, and a further circuit making and breaking device having contacts closed in a predetermined position of the unit relatively to a fixed reference system, to operate the coupling electromagnet in said predetermined position.

11. A system as claimed in claim 6 wherein the coupling means are electromagnetically operated and include a coupling electromagnet, an energizing circuit for the said coupling electromagnet, a circuit making and breaking device controlling said energizing circuit, said circuit making and breaking device including a member carried by one of the shafts, the angular position of which relatively to the angular position of the inertia mass carried by the same shaft is fixed and predetermined, so as to make and break the control circuit of the coupling electromagnet in exact conformity to the position of the weight relatively to a reference system associated with the frame.

12. A system as claimed in claim 6, wherein the unit shifting means are electromagnetically operated and include a unit shifting solenoid, an energizing circuit for the same and a circuit making and breaking device including a control member carried by one of the shafts, the angular position of which on said shaft is adjusted in a predetermined manner relatively to the angular position of the inertia mass carried by said shaft, shifting of the unit occurring in predetermined angular positions of the said inertia masses relatively to a reference system associated with the frame carrying said inertia masses.

13. A system as claimed in claim 6, wherein the unit shifting means are electromagnetically operated and include a unit shifting solenoid, an energizing circuit for the same and a circuit making and breaking device including a control member carried by one of the shafts, the angular position of which on said shaft is adjusted in a predetermined manner relatively to the angular position of the inertia mass carried by said shaft, shifting of the unit occurring in predetermined angular positions of the said inertia masses relatively to a reference system associated with the frame carrying said inertia masses, a further making and breaking device in said energizing circuit with contacts, one of which is carried by the oscillating unit and cooperates with a fixed contact, the energization of said shifting solenoid being thus dependent on the position of the unit relatively to a fixed reference system and on the angular position of the inertia masses.

14. A system as claimed in claim 11, wherein the unit shifting means are electromagnetically operated and include a unit shifting solenoid, an energizing circuit for the same and a circuit making and breaking device including a control member carried by one of the shafts, the angular position of which on said shaft is adjusted in a predetermined manner relatively to the angular position of the inertia mass carried by said shaft, shifting of the unit occurring in predetermined angular positions of the said inertia masses relatively to a reference system associated with the frame carrying said inertia masses, a still further circuit making and breaking device in the energizing circuit of the shifting solenoid with contacts, one of which is carried by the oscillating unit and cooperates with a fixed contact, the contacts of the further circuit making and breaking device associated with the coupling electromagnet and the contacts of the still further circuit making and breaking device associated with and controlling the shifting solenoid being so arranged that they are operated successively, the last named contacts being closed first.

15. A system as claimed in claim 10, wherein the coupling electromagnet acts directly on a tape of magnetically permeable material attached to the load and stretching along the unit.

16. A system as claimed in claim 10, wherein a plurality of aligned units is arranged and wherein the coupling electromagnets of the units act directly on a tape of magnetically permeable material running through the aligned units, and wherein the periods of energization of the control circuit controlled by the circuit making and breaking devices for different units are so selected that they succeed each other in a regular sequence so that the tape is constantly coupled with one of the units thus producing a substantially uniform action on the load.

17. A dynamic system producing unidirectional impulses comprising an outer frame, a further, movable frame, two spaced parallel shafts carried by said further movable frame, an eccentrically arranged inertia mass on each of said shafts, the center of gravity of which is eccentric with respect to the axis of rotation of the shaft, the inertia masses on the two parallel shafts being arranged symmetrically with respect to a plane of symmetry parallel to and passing between the rotating shafts, said inertia masses being rotated by said parallel shafts in opposite directions, means for freely suspending said further movable frame, said means including tension springs attached to said further movable frame and to the outer frame, means for adjusting the tension of said springs, a load device, coupling means coupling the load device with said freely suspended further movable frame, operating means for said coupling means, controlled by one of the rotating shafts and made operative solely during a predetermined phase of the oscillating movement of the further movable frame produced by the rotation of the inertia masses, shifting means moving the said further movable frame into a fixed predetermined position relatively to the outer frame, operating means for said shifting means controlled by one of the rotating shafts, the combined controlled action of the oscillating further movable freely suspended frame, of the coupling means coupling the load device and the freely suspended further movable frame during a phase of the oscillating movement during which it moves in one direction and of the shifting means bringing the said further movable frame into position for action on the load device after a complete oscillation, producing a sequence of unidirectional impulses imparted to said load device.

18. A dynamic system producing unidirectional impulses comprising an outer frame, a further movable frame carrying two spaced parallel rotating shafts, an eccentrically arranged inertia mass connected with each of said shafts, the center of gravity of each mass being eccentric with respect to its axis of rotation, said inertia masses on the two rotating shafts being arranged symmetrically and being rotated by said shafts in opposite directions, means for freely suspending said further, movable frame within said outer frame in a direction at right angles to the plane passing through the axes of the rotating shafts, means for driving one of said inertia masses carrying shafts from a stationary source of power including a power transmission shaft, means for coupling said inertia mass carrying rotating shaft and said power transmission shaft, said coupling means including members adapted to take up torsional stresses occurring between the inertia mass carrying rotating shafts and the power transmitting shaft, a load device to be moved unidirectionally, means controlled by one of the inertia mass carrying rotating shafts for coupling said load device with said freely suspended further, movable frame when moved in one predetermined direction and means controlled by the angular position of the inertia masses for shifting the further, movable frame into a fixed predetermined position relatively to the outer frame immediately before the operation of the coupling means coupling said load device and said further, movable frame for movement in one direction.

19. A system as claimed in claim 18 wherein the two inertia mass carrying shafts are connected by a gear transmission, driving them in opposite directions, and wherein one of the aforesaid inertia masses carrying shafts is provided with an extension joined to the power transmission shafts by means of torsion coupling and wherein said power transmitting shaft is connected with the source of power by means of universal joints and shafts joined for longitudinal extension.

References Cited in the file of this patent

UNITED STATES PATENTS

| | | |
|---|---|---|
| 2,350,248 | Nowlin | May 30, 1944 |
| 2,700,542 | Geyer | Jan. 25, 1955 |

FOREIGN PATENTS

| | | |
|---|---|---|
| 379,821 | Italy | Apr. 9, 1940 |